US008320389B2

(12) United States Patent
Zhang et al.

(10) Patent No.: US 8,320,389 B2
(45) Date of Patent: Nov. 27, 2012

(54) RELIABILITY PROCESSING METHODS AND SYSTEMS IN THE NETWORKING OF METRO ETHERNET NETWORK PROVIDING MULTI-SERVICE

(75) Inventors: Xuejiang Zhang, Shenzhen (CN); Guangyu Sun, Shenzhen (CN); Feng Gang, Shenzhen (CN); Ming Wei, Shenzhen (CN); Xindong Teng, Shenzhen (CN); Hongsen Mao, Shenzhen (CN); Shudong Wang, Shenzhen (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 304 days.

(21) Appl. No.: 12/536,030

(22) Filed: Aug. 5, 2009

(65) Prior Publication Data

US 2009/0290591 A1    Nov. 26, 2009

Related U.S. Application Data

(63) Continuation of application No. PCT/CN2007/002813, filed on Sep. 25, 2007.

(30) Foreign Application Priority Data

Feb. 5, 2007    (CN) .......................... 2007 1 0000420

(51) Int. Cl.
*H04L 12/56* (2006.01)
(52) U.S. Cl. ...................................................... 370/401
(58) Field of Classification Search ........... 370/401–403
See application file for complete search history.

(56) References Cited

U.S. PATENT DOCUMENTS 6,512,774 B1    1/2003  Vepa et al.
(Continued)

FOREIGN PATENT DOCUMENTS

CN    1571390    1/2005
(Continued)

OTHER PUBLICATIONS

Alcatel, "Optimizing the Broadband Aggregation Network for Triple Play", 2005.*

(Continued)

*Primary Examiner* — Dang Ton
*Assistant Examiner* — Kevin Lee
(74) *Attorney, Agent, or Firm* — Finnegan, Henderson, Farabow, Garrett & Dunner, LLP

(57) ABSTRACT

A reliability processing method and system in networking of Metro Ethernet Network providing multi-service are provided. The method includes: establishing a Virtual Router Redundancy Protocol (VRRP) group with at least two service control gateways, establishing network connections between an access device (UPE) and the service control gateways in the Virtual Router Redundancy Protocol group by a Virtual Private LAN Service (VPLS); establishing Layer 2 service and Layer 3 service connections between an active service control gateway and the Access device after active and standby service control gateways in the Virtual Router Redundancy Protocol group are determined according to a processing result of a Virtual Router Redundancy Protocol message, and performing Layer 2 service and Layer 3 service processing. With the present invention, when the MAN service is in fault, all the Layer 2 and Layer 3 services may be switched to the standby service control gateway quickly, and the switching may be on the order of milliseconds. Therefore, the reliability of the Layer 2 and Layer 3 services of the MAN may be sufficiently guaranteed, and the overhead of the system may be reduced significantly.

13 Claims, 3 Drawing Sheets

U.S. PATENT DOCUMENTS

| | | |
|---|---|---|
| 2002/0184387 A1 | 12/2002 | Yamaya et al. |
| 2003/0037165 A1 | 2/2003 | Shinomiya |
| 2004/0233891 A1 | 11/2004 | Regan et al. |
| 2006/0047851 A1 | 3/2006 | Voit et al. |
| 2007/0008982 A1 | 1/2007 | Voit et al. |

FOREIGN PATENT DOCUMENTS

| | | |
|---|---|---|
| CN | 1581821 A | 2/2005 |
| CN | 1848807 | 10/2006 |
| CN | 1863198 | 11/2006 |
| CN | 1968260 A | 5/2007 |
| CN | 101014035 | 8/2007 |
| EP | 1 594 264 A1 | 11/2005 |
| EP | 1601140 | 11/2005 |
| JP | 2004080217 | 3/2004 |

OTHER PUBLICATIONS

Hinden, RFC 3768 "Virtual Router Redundancy Protocol (VRRP)", Apr. 2004.*

Extended European Search Report dated (mailed) Mar. 12, 2010, issued in related Application No. 07816429.0-2416/2124418 PCT/CN2007002813, filed May 23, 2008, Hauwei Technologies Co., Ltd.

Written Opinion of the International Searching Authority (translation) dated (mailed) Jan. 10, 2008, issued in related Application No. PCT/CN2007/002813, Huawei Technologies Co., Ltd.

European Patent Office Communication pursuant to Article 94(3) EPC, European search opinion for Application No. 07816429.0-2414, mailed Feb. 1, 2011, Huawei Technologies Co., Ltd.

R. Hinden, Ed., "Virtual Router Redundancy Protocol (VRRP)" Copyright (C) The Internet Society (2004).

Zou, Runsheng, Realizing router redundancy and load balance of network by VRRP technology, Computer & Information Technology, Apr. 30, 2006, p. 54-56, China Academic Journal Electronic Publishing House.

R. Hinden, "Virtual Router Redundancy Protocol (VRRP)," Network Working Group, Request for Comments: 3768, XP 15009548A, dated Apr. 2004.

Newell, "Optimizing the Broadband Aggregation Network for Triple Play Services," Alcatel Tele. Review, 4th Quarter 2004, Dec. 31, 2004.

Extended European Search Report issued in related EP 11006892.1 dated Oct. 7, 2011.

Office Action issued in related Japanese Application No. 2009-548561, dated Mar. 29, 2011.

* cited by examiner

RELIABILITY PROCESSING METHODS AND SYSTEMS IN THE NETWORKING OF METRO ETHERNET NETWORK PROVIDING MULTI-SERVICE

CROSS-REFERENCE TO RELATED APPLICATIONS

This application is a continuation of International Application No. PCT/CN2007/002813, filed on Sep. 25, 2007, which claims the benefit of Chinese Application No. 200710000420.X, filed on Feb. 5, 2007, both of which are hereby incorporated by reference in their entireties.

FIELD OF THE INVENTION

The present invention relates to the reliability processing technique for Metropolitan (Metro) Ethernet data, and more particularly, to the reliability processing methods and systems in the networking of Metro Ethernet Network providing multi-service.

BACKGROUND

The Ethernet technique, simple and familiar to users, originates from the Local Area Network (LAN). Moreover, the Ethernet is a standard technique with good interoperability, support from wide software and hardware, and low cost. Meanwhile, it is a media-independent bearer technique which may interface with different transmission medium such as the twisted pairs, cable and various optical fibers, thereby avoiding the cost of rewiring. Therefore, the Ethernet networking technique is being significantly developed, and is becoming the bearer network for the Metro Area Network (MAN).

However, for the operable telecom-level Metro Ethernet, there are many problems to be solved regarding the architecture, network management, protection technique, Quality of Service (QoS) technique, as well as the service provision. With respect to the service protection, the Ethernet is originally designed for the internal applications for LAN users, without guarantee from a security mechanism. After it is extended to the telecom-level Metro Ethernet, a more reliable security mechanism is required in order to provide the reliability guarantees for the telecom services within the MAN. The Ethernet may be applied in the Metro telecom network environment as a telecom-level multi-service platform only if the major problem above is solved properly.

The conventional techniques involved in the present invention are briefly illustrated below.

1. Multi-Protocol Label Switching (MPLS) Technique

The MPLS belongs to the network architecture of the 3rd generation, and is a high-speed IP backbone switching standard of the new generation proposed by the Internet Engineering Task Force (IETF). The MPLS is a switching technique with the Layer 3 route incorporating the Layer 2 attributes, and introduces a label-based mechanism, in which the routing and data forwarding are separated and the path by which a packet passes through the network is specified by the label.

2. Virtual Private LAN Service (VPLS) technique

The VPLS is a service providing a similar LAN on the MPLS network. The VPLS enables users at dispersed geographical locations to access the network simultaneously and access each other, as if these locations are connected to the LAN directly. The VPLS enables the users to extend their LANs to the MAN, even to the Wide Area Network (WAN).

3. Virtual Router Redundancy Protocol (VRRP) technique

Generally, all the hosts in an internal network are configured with the same default route, pointing to the export gateway, thereby implementing the communications between the hosts and the external networks. If the export gateway is in fault, the communications between the hosts and the external networks will be interrupted. It is a common method to configure multiple export gateways in order to improve the system reliability. However, the routing among the multiple export gateways becomes a problem to be solved. The VRRP is a fault-tolerant protocol, in which the implementation of the physical devices and logical devices is separated and the default gateway of the terminal IP device is redundancy backed up, so that a standby router will take over the forwarding work upon one router is out of work, thereby providing transparent switching to the user, and solving the problem noted above properly.

In the conventional art, the services deployed on the Metro Area Network generally include many types of services, such as the Internet service, Virtual Private Network (VPN) service, Broadcast TV (BTV) service, and Video on demand/Voice over IP (VOD/VOIP) service. In the practical networking, the network architecture includes a backbone layer, and a convergence & access layer. Service Routers (SRs) are deployed at the network edge of the backbone layer and the convergence & access layer to implement the functions, such as the MAN service control, user control, and security control. Generally, in order to ensure the reliability of the network, the network service routers are disposed in an active-standby manner, so that the standby device starts to operate upon the active device is in fault, thereby ensuring that the network service will not be interrupted.

For the Layer 3 network services, such as the VOD, VOIP, and Layer 3 VPN, the VRRP protocol may be configured between the active and standby service routers, so that the related services may be switched to the standby service router when the network is in fault or the active service router is in fault. However, the VRRP is a Layer 3 network protocol not applicable for Layer 2 services, such as the internet (PPP access) service, and Layer 2 VPN service. Thus, when the network is in fault or the active service router is in fault, there is no highly effective protection method to switch the Layer 2 services for users to the standby service router quickly. In the conventional technique, the Layer 2 service switches to the path of the standby router with a Spanning Tree Protocol (STP) algorithm. However, the STP algorithm has a relatively long convergence time, which may not satisfy the requirement of rapid switching of network services. Accordingly, a disadvantage of the conventional technique is the lack of an effective, rapid and reliable redundancy standby mechanism for Layers 2 and Layer 3 services.

SUMMARY

Reliability processing methods and systems in networking of a Metro Ethernet Network providing multi-service are provided in various embodiments of the present invention, to solve the problem of reliability protection technique in the conventional art for uniformly switching of the various services deployed in the Metro Ethernet Network when the Metro Ethernet Network is in fault.

A reliability processing method in networking of a Metro Ethernet Network providing multi-service is provided according to an embodiment of the present invention.

The method includes: establishing a Virtual Router Redundancy Protocol (VRRP) group with at least two service control gateways (service routers), and establishing network connections between an access device (UPE) and the service control gateways in the VRRP group by a Virtual Private LAN Service (VPLS); and establishing Layer 2 service and Layer 3 service connections between an active service control gateway and the access device after active and standby service control gateway in the VRRP group are determined according to a processing result of a VRRP message, and performing Layer 2 service and Layer 3 service processing.

A reliability processing system in networking of a Metro Ethernet Network providing multi-service is also provided according to an embodiment of the present invention.

The system includes: an access device (UPE) and at least two service control gateways, and further includes a service switching module.

The at least two service control gateways form a Virtual Router Redundancy Protocol (VRRP) group, and the access device establishes network connections with the service control gateways in the VRRP group by a Virtual Private LAN Service (VPLS), respectively.

The service switching module is configured to establish Layer 2 service and Layer 3 service connections between an active service control gateway and the access device after active and standby service control gateways in the VRRP group are determined according to a processing result of a VRRP message, and perform Layer 2 service and Layer 3 service processing.

The beneficial effect of the embodiments of the present invention is that when the Metro Ethernet Network is in fault, the various services deployed in the Metro Ethernet Network may be switched uniformly, so as to provide protection for the reliability of the multi service connections.

BRIEF DESCRIPTION OF THE DRAWING(S)

DETAILED DESCRIPTION

Figure 1:
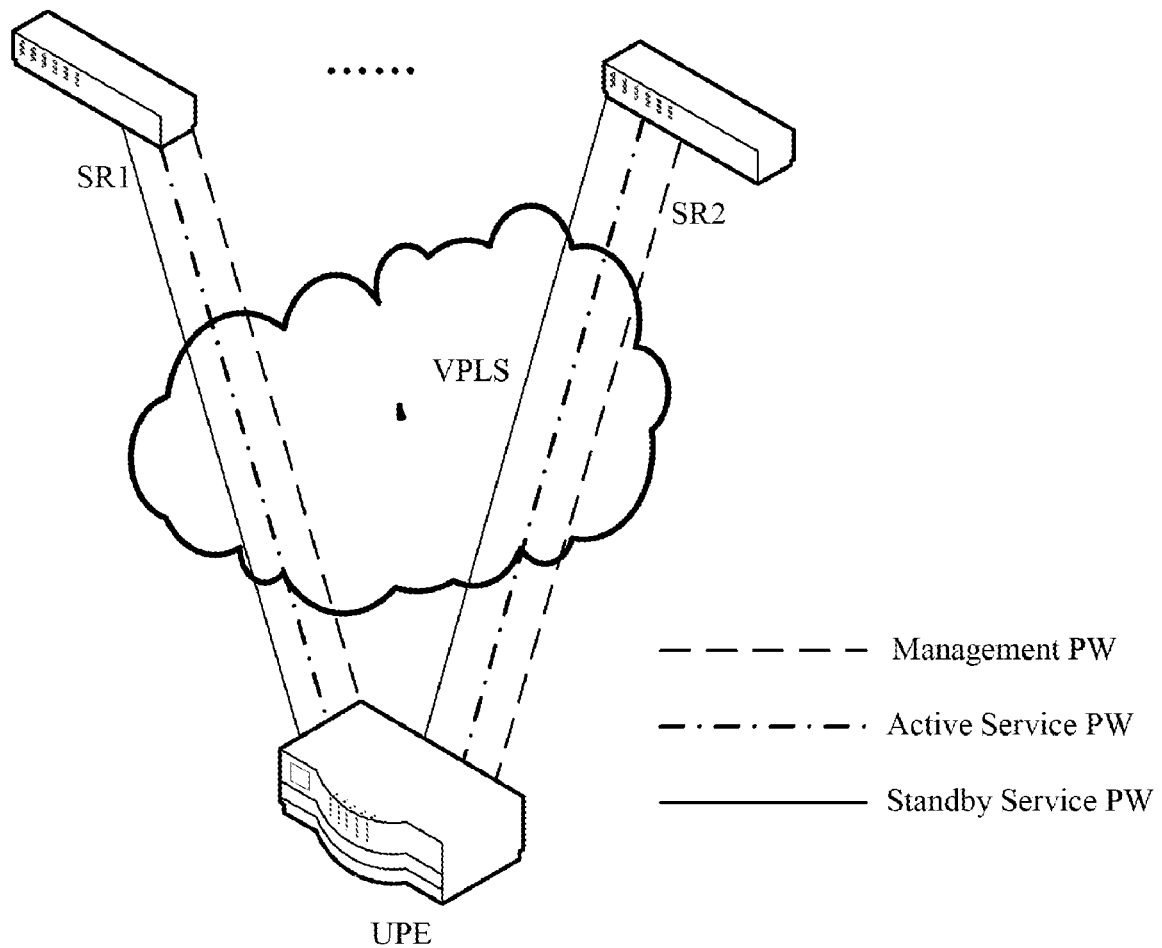
FIG. 1 is a schematic diagram of an application environment for a reliability processing method in the Metro Area Network (MAN) providing multi-service, according to an embodiment.

The embodiments of the present invention are illustrated in conjunction with the drawings below.

In the Virtual Router Redundancy Protocol (VRRP), there are two groups of important concepts: VRRP router and virtual router, as well as active router and standby router. The VRRP router refers to the router running the VRRP and is a physical entity; and the virtual router is a logical concept created by the VRRP protocol. A group of VRRP routers co-operate to constitute a virtual router. The virtual router appears to the external as a logical router with a unique fixed Internet Protocol (IP) address and Media Access Control (MAC) address. The routers within the same VRRP group have two exclusive roles: active router and standby router. There has and only has one active router and may have one or more standby routers in one VRRP group. The VRRP protocol uses a selection policy to select one from the router group as the active, which is responsible for the Address Resolution Protocol (ARP) response and forwarding the IP data packets. The other routers in the group are standby routers in a standby status. When the active router is in fault for some reason, a standby router may be upgraded to an active router after a delay of several seconds. The switching is transparent to the end users since it is very rapid and does not change the IP address and the MAC address.

In an embodiment of the present invention, the Virtual Private LAN Service (VPLS) is deployed at the Convergence & Access Layer of the Metro Area Network (MAN). Multiple VPLS data links are established between a service control gateway, for example, service router (SR) and an access device, for example, User facing Provider Edge Router (UPE), for different services, where all the data links are managed uniformly at the SR. Also, a VRRP management group is configured for each UPE at the SR. The VRRP protocol is running between the VRRP management groups of the active and standby SRs. The SRs set the related data links as active or standby according to a VRRP state. An active data link may send and receive data normally, while a standby data link sends and receives no service data except the VRRP messages. If the network or the active SR is in fault, a standby SR is changed to an active device by the rapid detection mechanism of the VRRP, and the related data links are changed to an active state, so that the data services may be switched to the standby SR quickly. With the Bidirectional Forwarding Detection, for example, BFD for VRRP, service protection switching on the order of milliseconds may be achieved.

With the same principle, the VPLS may be deployed at the Convergence & Access Layer of the MAN, and multiple VPLS data links are established between a service router and the UPE for different services. Also, a VRRP management group is configured for each UPE at the SR, while the VRRP management group may utilize the Layer 3 service interface. The VRRP protocol runs between the VRRP management groups of the two SRs. The UPE manages all the service data links uniformly, and directs all the egress interfaces for the Layer 2 and Layer 3 service data to the service data links connected to the active SR after receiving a gratuitous ARP messages issued from the active SR. If the network or the active SR is in fault, a standby SR is changed to an active device by the rapid detection mechanism of the VRRP, for sending a control message to the UPE. After receiving the message, the UPE modifies the directions of all the egress interfaces for the Layer 2 and Layer 3 service data, so that the data services may be switched to the standby service router quickly. With the BFD for VRRP, service protection switching on the order of milliseconds may be achieved.

In other words, the services between the service router and the UPE are transmitted via the VPLS data links. Connectivity detection is performed between the active and standby service routers, and the data links are set to an active or standby state according to the detection state. A standby data link sends and receives no data. The correct forwarding of all the Layer 2 and Layer 3 data and the protection switching in network fault are guaranteed by identifying the active or standby state of the data links. Or, the UPE may direct all the egress interfaces for the Layer 2 and Layer 3 service data to the service data links connected to the active service router after receiving a control message issued from the active service router, so as to achieve the correct forwarding of the Layer 2 and Layer 3 data as well as the protection switching in network fault.

FIG. 1 is a schematic diagram of an application environment of a reliability processing method in a MAN providing multi-service. As illustrated, a VRRP group is established with at least two service routers (SRs). Network connections between the UPE and the service routers in the VRRP group are established by the Virtual Private LAN Service (VPLS), respectively.

Two service routers are shown as an example, i.e., the UPE is connected to two service routers, SR1 and SR2, respectively. The VPLS is running between the service routers and the UPE. The UPE establishes two VPLS Pseudo-Wires (PWs) for each accessed service, one to SR1, and the other to SR2.

One VRRP group is configured between the two SRs. The VRRP group transmits the VRRP protocol messages between SR1 and SR2 by the PWs with the UPE. The BFD for VRRP may be run in order to accelerate the detection.

According to a VRRP protocol state, the active SR sets its service PWs to an active state, and the standby SR sets its service PWs to a standby state. The PW in the standby state sends and receives no service message except the VRRP messages.

Figure 2:
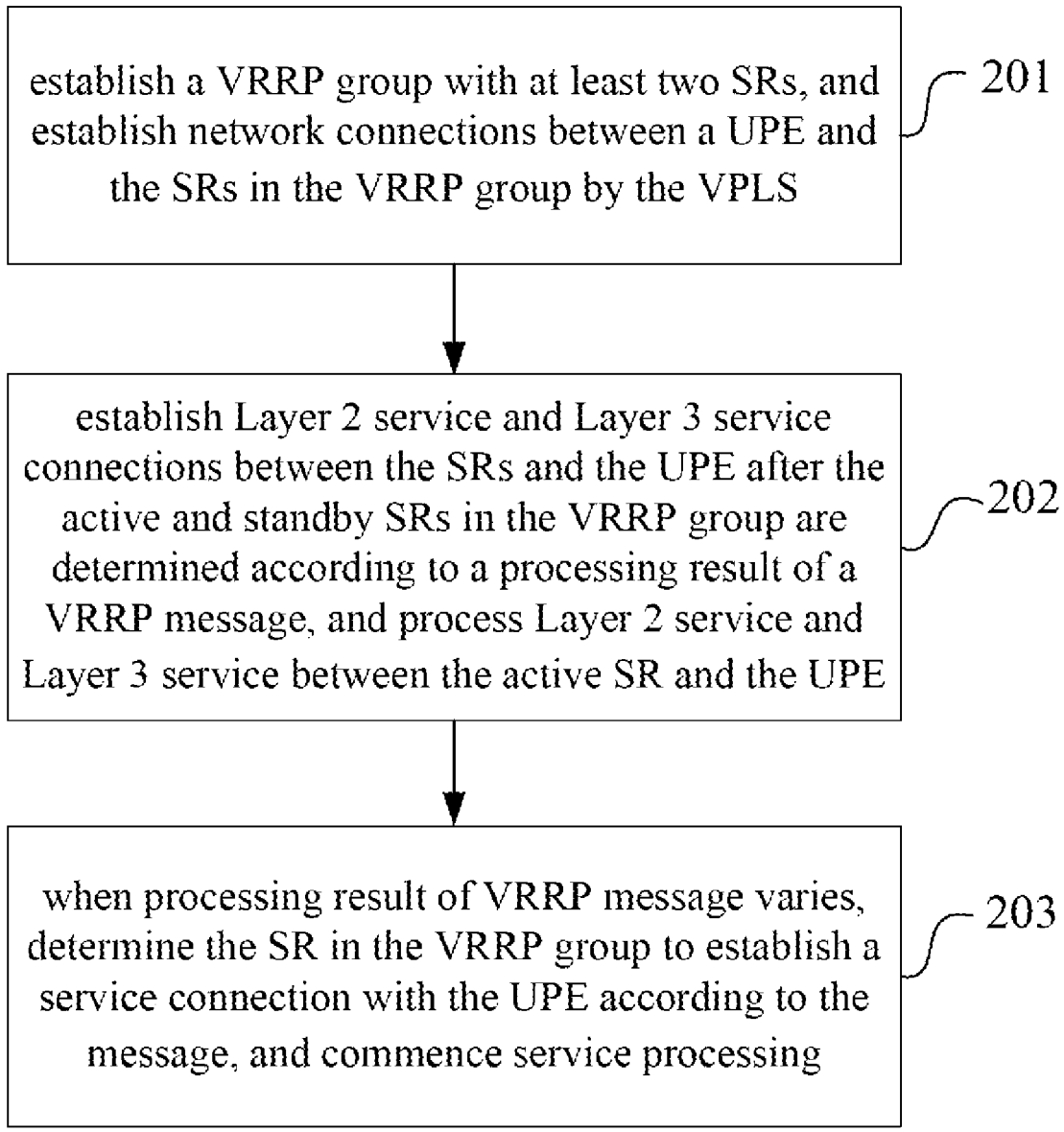
FIG. 2 is a schematic flowchart of implementing a reliability processing method in the MAN providing multi-service, according to an embodiment.

FIG. 2 is a schematic flowchart of implementing a reliability processing method in the Metro Area Network providing multi-service. As illustrated, the method includes the following steps.

Step 201: A VRRP group is established with at least two service routers, and network connections between a UPE and the service routers in the VRRP group are established by the Virtual Private LAN Service (VPLS), respectively.

Step 202: After the active and standby service routers in the VRRP group are determined according to a processing result of a VRRP message, Layer 2 service and Layer 3 service connections between the service routers and the UPE are established, and the Layer 2 service and Layer 3 service processing between the active service router and the UPE are performed.

For the Layer 3 service, a service router notifies the UPE, which establishes the Layer 3 service connection with the service router. In the implementation, for the Layer 3 service, the service router may notify the UPE of the gateway address via a gratuitous ARP message; for the Layer 2 service, the UPE broadcasts a message and establishes the Layer 2 service connection with the service router according to a response message.

In the implementation, the UPE may be notified that which device is the active device by a service router. The UPE establishes the Layer 2 and Layer 3 service connections with the active service router according to the notification, and performs the service processing.

Step 203: When the processing result of the VRRP message varies, the service router in the VRRP group to establish a service connection with the UPE is determined according to the message, and the service processing is commenced.

For the Layer 3 service, the service router notifies the UPE of the gateway address, and the UPE establishes a Layer 3 service connection with the service router. In the implementation, for the Layer 3 service, the service router may notify the UPE via the gratuitous ARP message. For the Layer 2 service, after the service router to establish a service connection with the UPE is altered according to the processing result of the VRRP message, the altered service router may send a control message to the UPE by the VPLS control protocol. The UPE relearns the gateway address according to the control message, and commences the Layer 2 service processing with the active service router.

In the implementation, after the service router to establish a service connection with the UPE is altered according to the processing result of the VRRP message, the altered service router may notify the UPE, which commences the Layer 2 and Layer 3 service processing with the service router according to the notification. The altered service router may notify the UPE via a gratuitous ARP message, and the UPE commences the Layer 2 and Layer 3 service processing with the service router according to the gratuitous ARP message.

In the above embodiment, when the network is in normal operation:

The VRRP protocol between the SRs operates normally, and the two SRs are set to the proper active and standby states. For the Layer 3 service, the active SR sends a gratuitous ARP message to the UPE at the related service PW, so that the service data related to the UPE may be transmitted to the active SR. For the Layer 2 service, the UPE may learn the MAC address first, and send a broadcast message to SR1 and SR2 via the two service PWs. The active SR may respond the UPE message, while the standby SR performs no processing. As such, after the UPE learns the MAC address from the active SR, the subsequent messages will be transmitted to the active SR device by unicast.

When the active SR is in fault or the network from the UPE to the active SR is in fault:

The standby SR2 is changed to the VRRP active state if it is unable to receive the VRRP protocol message. Meanwhile, the related service PW is changed to the active state. After SR2 is changed to the active device, for the Layer 3 service, a gratuitous ARP message is sent to the UPE via the related service PW, so that the service data related to the UPE may be transmitted to the proper service router. After SR2 is changed to the active device, for the Layer 2 service, a MAC address withdraw message is sent to the UPE by the VPLS control protocol, so that the UPE may relearn the MAC address, and direct the gateway of the Layer 2 service to SR2.

For the situation where the UPE directs all the egress interfaces for the Layer 2 and Layer 3 service data to the service PW connected to the active SR to implement the proper forwarding of data after receiving the gratuitous ARP message issued from the active SR, when the network is in normal operation:

The VRRP protocol between the SRs operates normally, and the two SRs are set to the proper active and standby states. The active SR issues a gratuitous ARP message, and the UPE directs all the egress interfaces for the Layer 2 and Layer 3 service data to the service PW connected to the active SR after receiving the message, so that the subsequent Layer 2 and Layer 3 service data may be forwarded properly.

When the active SR is in fault or the network from the UPE to the active SR is in fault:

The standby SR2 is changed to the VRRP active state if it is unable to receive the VRRP protocol message, and sends a gratuitous ARP message to the UPE at the same time. The UPE modifies the egress interfaces for all Layer 2 and Layer 3 service data to point to the service PW connected to SR2 after receiving the gratuitous ARP message, so that the subsequent Layer 2 and Layer 3 service data may be forwarded properly.

A reliability processing system in the MAN providing multi-service is also provided according to an embodiment of the present invention. The implementation of the system will be illustrated below in conjunction with the drawings.

Figure 3:
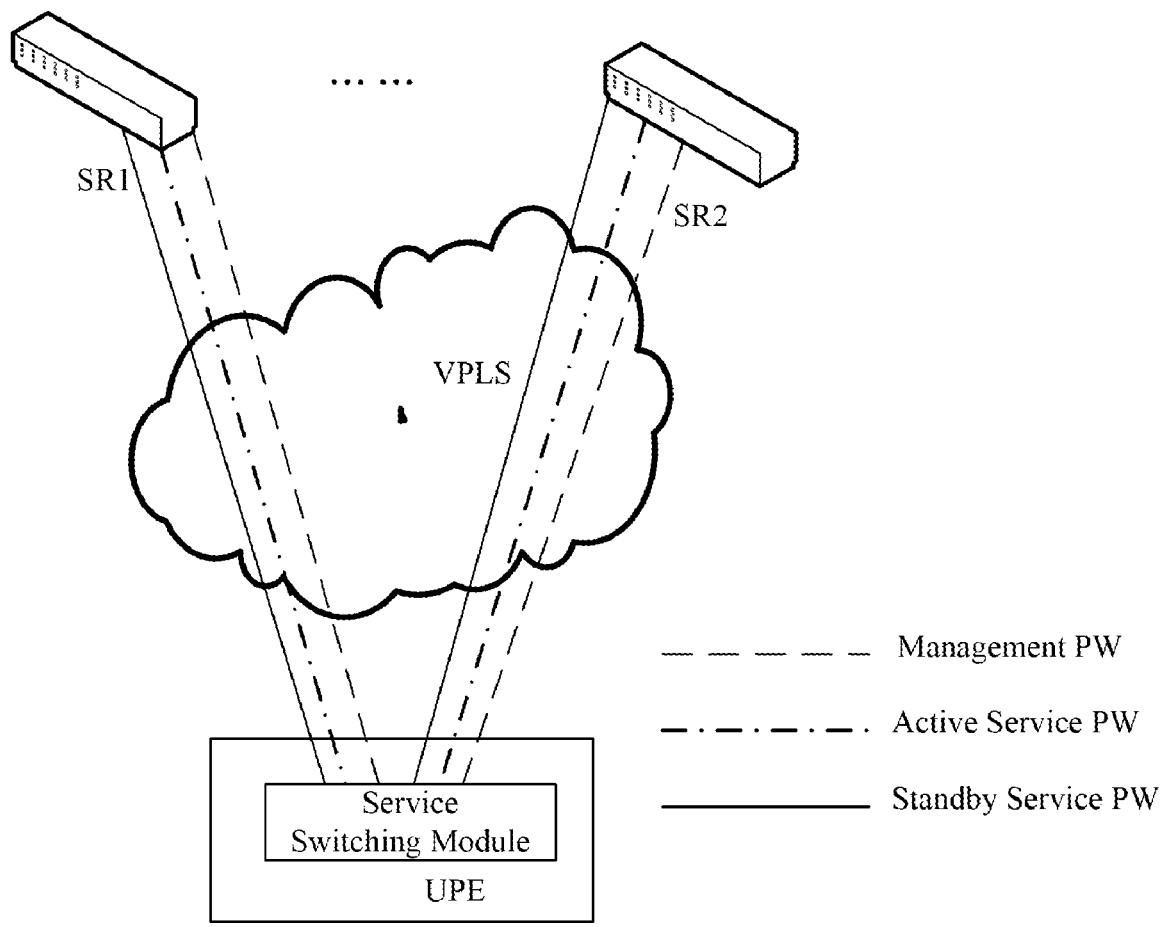
FIG. 3 is a schematic block diagram of a reliability processing system in the MAN providing multi-service, according to an embodiment.

FIG. 3 is a schematic block diagram of a reliability processing system in the MAN providing multi-service. As illustrated, the system includes a UPE and at least two service routers, as well as a service switching module.

The at least two service routers form a virtual router Redundancy protocol (VRRP) group. The UPE establishes network connections with the service routers in the VRRP group by the Virtual Private LAN Service (VPLS), respectively.

The service switching module determines the active and standby service routers in the VRRP group according to a processing result of a VRRP message, establishes Layer 2 service and Layer 3 service connections between the active service router and the UPE, and performs the Layer 2 service and Layer 3 service processing.

For the Layer 3 service, the service switching module establishes the Layer 3 service connection between the UPE and a service router according to the notification from the service router, and performs service processing; for the Layer 2 service, after the UPE broadcasts a message, the service switching module establishes the Layer 2 service connection between the UPE and the service router according to a response message, and performs service processing.

For the Layer 2 service, after the service router to establish a service connection with the UPE is altered according to the processing result of the VRRP message, the service switching module switches to the Layer 2 service connection between the UPE and the altered service router according to the response message sent by the altered service router by the VPLS control protocol, and commences the service processing.

The service switching module may also perform the service processing via the Layer 2 and Layer 3 service connections between the UPE and the service router according to the notification from the service router.

After the service router to establish a service connection with the UPE is altered according to the processing result of the VRRP message, the service switching module switches to the Layer 2 and Layer 3 service connections between the UPE and the altered service router according to a notification from the altered service router to perform service processing.

As apparent from the above embodiments, when the MAN SR is in fault or the network from the SR to the UPE is in fault, all the Layer 2 and Layer 3 services may be switched to the standby service router quickly, where the switching may be implemented in milliseconds. The service reliability for the Layer 2 and Layer 3 services of the MAN, including the Internet service, VPN service, VOD/VOIP, etc., may be sufficiently guaranteed. Since the VRRP protocol will not run repeatedly between the service routers for all the network services for connectivity detection, the overhead of the system may be reduced significantly.

Apparently, various modifications and variations may be made by those skilled in the art without departing from the scope of the present invention. As such, if these modifications and variations fall within the scope of the claims of the present invention and the equivalents thereof, these modifications and variations are intended to be within the present invention.

What is claimed is:

1. A reliability processing method implemented in a Metro Ethernet Network providing for multiple services, the method comprising:

establishing a Virtual Router Redundancy Protocol (VRRP) group with at least two service control gateways;

establishing, by a Virtual Private LAN service (VPLS), network connections between an access device and the service control gateways;

determining an active service control gateway and a standby service control gateway in the Virtual Router Redundancy Protocol group according to a processing result of a Virtual Router Redundancy Protocol message;

establishing a Layer 2 service connection and a Layer 3 service connection between the active service control gateway and the access device; and performing Layer 2 service and Layer 3 service processing;

establishing, by the access device, a first VPLS Pseudo-Wire (PW) and a second VPLS Pseudo-Wire (PW) for each accessed service, wherein the first VPLS PW is connected to the active service control gateway and the second VPLS PW is connected to the standby service control gateway;

setting, by the active service control gateway, the first VPLS PW to an active state; and setting, by the standby service control gateway, the second VPLS PW to a standby state, wherein the second VPLS PW sends and receives the VRRP message;

establishing an additional Layer 2 service and an additional Layer 3 service connections between the standby service control gateway and the access device;

for the Layer 2 service, after the active service control gateway and the standby service control gateway are interchanged according to a processing result of a Virtual Router Redundancy Protocol message, sending, by the altered active service control gateway, a media access control (MAC) address withdraw message to the access device by the second Virtual Private LAN Service control protocol;

broadcasting, by the access device, a message to the service control gateways in the Virtual Router Redundancy Protocol group;

responding, by the new active service control gateway, a message to the access device; and performing, by the access device, Layer 2 service processing with the new active service control gateway according to the response message.

2. The method of claim 1, wherein establishing the Layer 2 service connection and the Layer 3 service connection comprising:

for the Layer 3 service, notifying, by the active service control gateway, the access device of an address of the active service control gateway, and establishing, by the access device, the Layer 3 service connection with the active service control gateway according to the gateway address;

for the Layer 2 service, obtaining, by the access device after broadcasting a message, the gateway address according to a response message from the active service control gateway, and establishing, by the access device, the Layer 2 service connection with the active service control gateway according to the gateway address.

3. The method of claim 2, wherein for the Layer 3 service, notifying, by the active service control gateway, the access device of the address of the active service control gateway by a gratuitous Address Resolution Protocol (ARP) message via a Virtual Private LAN Service (VPLS) pseudo-wire (PW).

4. The method of claim 2, wherein for the Layer 2 service, broadcasting, by the access device, the message to the service control gateways in the Virtual Router Redundancy Protocol group via a Virtual Private LAN Service pseudo-wire;

sending, by the active service control gateway, the access device a response message; and establishing, by the access device, the Layer 2 service connection with the active service control gateway according to the response message.

5. The method of claim 1, wherein establishing the connections comprising:
  notifying, by the active service control gateway, the access device of an address of the active service control gateway; and
  establishing, by the access device, the Layer 2 service and Layer 3 service connections with the active service control gateway according to the notification.

6. The method of claim 5, further comprising notifying, by the active service control gateway, the access device by a gratuitous Address Resolution Protocol message via a service pseudo-wire; and
  establishing, by the access device, the Layer 2 service and Layer 3 service connections with the active service control gateway according to the gratuitous Address Resolution Protocol message.

7. The method of claim 1, further comprising:
  after the active service control gateway and standby service control gateway are interchanged according to a processing result of a Virtual Router Redundancy Protocol message,
  notifying, by the new active service control gateway, the access device of the address of the new active service control gateway; and
  performing, by the Access device, Layer 2 and Layer 3 service processing with the new active service control gateway according to the notification.

8. The method of claim 7, further comprising:
  notifying, by the new service control gateway, the Access device by a gratuitous Address Resolution Protocol message via a service pseudo-wire, and the Access device performs Layer 2 and Layer 3 service processing with the new service control gateway according to the gratuitous Address Resolution Protocol message.

9. The method of claim 1, wherein the Virtual Router Redundancy Protocol message is transmitted via a pseudo-wire.

10. A reliability processing system in a Metro Ethernet Network providing multiple services, comprising:
  an access device;
  at least two service control gateways; and
  a service switching module, wherein:
    the at least two service control gateways form a Virtual Router Redundancy Protocol (VRRP) group;
    the access device establishes network connections with the service control gateways in the Virtual Router Redundancy Protocol group by a Virtual Private LAN Service (VPLS);
    an active service control gateway and a standby service control gateway in the Virtual Router Redundancy Protocol group are determined according to a processing result of a Virtual Router Redundancy Protocol message;
    the service switching module is configured to establish a Layer 2 service connection and a Layer 3 service connection between the active service control gateway and the access device and to perform Layer 2 service and Layer 3 service processing;
    the access device establishes a first VPLS Pseudo-Wire (PW) and a second VPLS Pseudo-Wire (PW) for each accessed service;
    the first VPLS PW is connected to the active service control gateway;
    the second VPLS PW is connected to the standby service control gateway;
    the active service control gateway sets the first VPLS PW to an active state;
    the standby service control gateway sets the second VPLS PW to a standby state; and
    the second VPLS PW in the standby state sends and receives the VRRP message;
      wherein an additional Layer 2 service and an additional Layer 3 service connections are established between the standby service control gateway and the access device;
    wherein:
      for the Layer 2 service, after the active service control gateway and the standby service control gateway are interchanged according to a processing result of a Virtual Router Redundancy Protocol message:
        the altered active service control gateway sends a media access control (MAC) address withdraw message to the access device by the second Virtual Private LAN Service control protocol;
        the access device broadcasts a message to the service control gateways in the Virtual Router Redundancy Protocol group;
        the new active service control gateway responds with a message to the access device; and
        the access device performs Layer 2 service processing with the new active service control gateway according to the response message.

11. The system of claim 10, wherein the service switching module is configured, for the Layer 3 service, to establish the Layer 3 service connection between the access device and the active service control gateway according to a gateway address notified to the Access device by the active service control gateway, and is configured, for the Layer 2 service, to establish the Layer 2 service connection between the Access device and the active service control gateway according to a gateway address obtained from a response message of the active service control gateway after the Access device broadcasts a message;
  or, the service switching module is configured to establish the Layer 2 and Layer 3 service connections between the access device and the active service control gateway according to a notification of the active service control gateway.

12. The system of claim 10, wherein the service switching module is further configured to establish Layer 2 and Layer 3 service connections between the access device and the standby service control gateway.

13. The system of claim 12, wherein after the active and standby service control gateway are interchanged according to a processing result of a Virtual Router Redundancy Protocol message, the service switching module is further configured to switch to the Layer 2 and Layer 3 service connections between the access device and the new active service control gateway to perform Layer 2 and Layer 3 service processing according to a notification from the new active service control gateway.

* * * * *